(12) United States Patent
Jumpertz

(10) Patent No.: US 6,720,878 B2
(45) Date of Patent: Apr. 13, 2004

(54) DATA COMMUNICATIONS SYSTEM FOR MASK OR HELMET USERS

(75) Inventor: Werner Jumpertz, Stockelsdorf (DE)

(73) Assignee: Dräger Safety AG & Co. KGAA, Lübeck (DE)

(*) Notice: Subject to any disclaimer, the term of this patent is extended or adjusted under 35 U.S.C. 154(b) by 0 days.

(21) Appl. No.: 10/177,851

(22) Filed: Jun. 20, 2002

(65) Prior Publication Data
US 2003/0058100 A1 Mar. 27, 2003

(30) Foreign Application Priority Data
Sep. 25, 2001 (DE) ......................... 101 47 045

(51) Int. Cl.[7] ............................................. G08B 23/00
(52) U.S. Cl. ............................ 340/573.1; 340/286.05; 345/8
(58) Field of Search .................... 340/980, 286.05, 340/573.1; 345/7, 8, 9; 359/356; 250/330

(56) References Cited

U.S. PATENT DOCUMENTS

| | | | |
|---|---|---|---|
| 4,796,987 A | | 1/1989 | Linden ........................ 351/158 |
| 5,060,308 A | * | 10/1991 | Bieback ....................... 359/154 |
| 5,072,209 A | * | 12/1991 | Hori et al. ................... 340/432 |
| 5,157,378 A | * | 10/1992 | Stumberg et al. ........... 340/521 |
| 5,671,158 A | | 9/1997 | Fournier et al. |
| 5,990,793 A | * | 11/1999 | Bieback ................... 340/573.1 |
| 6,121,881 A | * | 9/2000 | Bieback et al. .......... 340/573.1 |
| 6,292,158 B1 | * | 9/2001 | Amafuji et al. ................. 345/7 |
| 6,456,261 B1 | * | 9/2002 | Zhang ............................ 345/8 |
| 6,476,391 B1 | * | 11/2002 | Zhang ........................ 250/330 |
| 6,522,474 B2 | * | 2/2003 | Cobb et al. ................. 359/633 |

FOREIGN PATENT DOCUMENTS

| | | |
|---|---|---|
| DE | 44 35 484 A1 | 4/1995 |
| DE | 44 25 262 C1 | 8/1995 |
| DE | 198 02 220 A1 | 7/1999 |

* cited by examiner

Primary Examiner—Brent A. Swarthout
(74) Attorney, Agent, or Firm—McGlew and Tuttle, P.C.

(57) ABSTRACT

A data communications system includes a data display (3) in a mask or helmet visor (2) to enable the user to display various data as needed. The system has a mask (1) or a helmet with a voice transmitter (4) with a microphone (5) as well as a transmitter unit (6) on the output side. The system has a receiver unit (15) for the data display (3) on the input side. An evaluating unit (8) is equipped with a receiver unit (7) and a transmitter unit (14) for data communication with the transmitter and receiver units (6, 15) of the mask (1) or of the helmet. The evaluating unit (8) receives the measured data from at least one measuring device (21, 22, 23) via associated transmitter units (11, 12, 13). The evaluating unit (8) has stored, preset voice patterns and is voice-controlled, so that depending on the voice signals received by the receiver unit (7) and after comparison with the stored, preset voice patterns, it transmits selected measured data to the receiver unit (15), and these measured data are displayed in the data display (3).

20 Claims, 1 Drawing Sheet

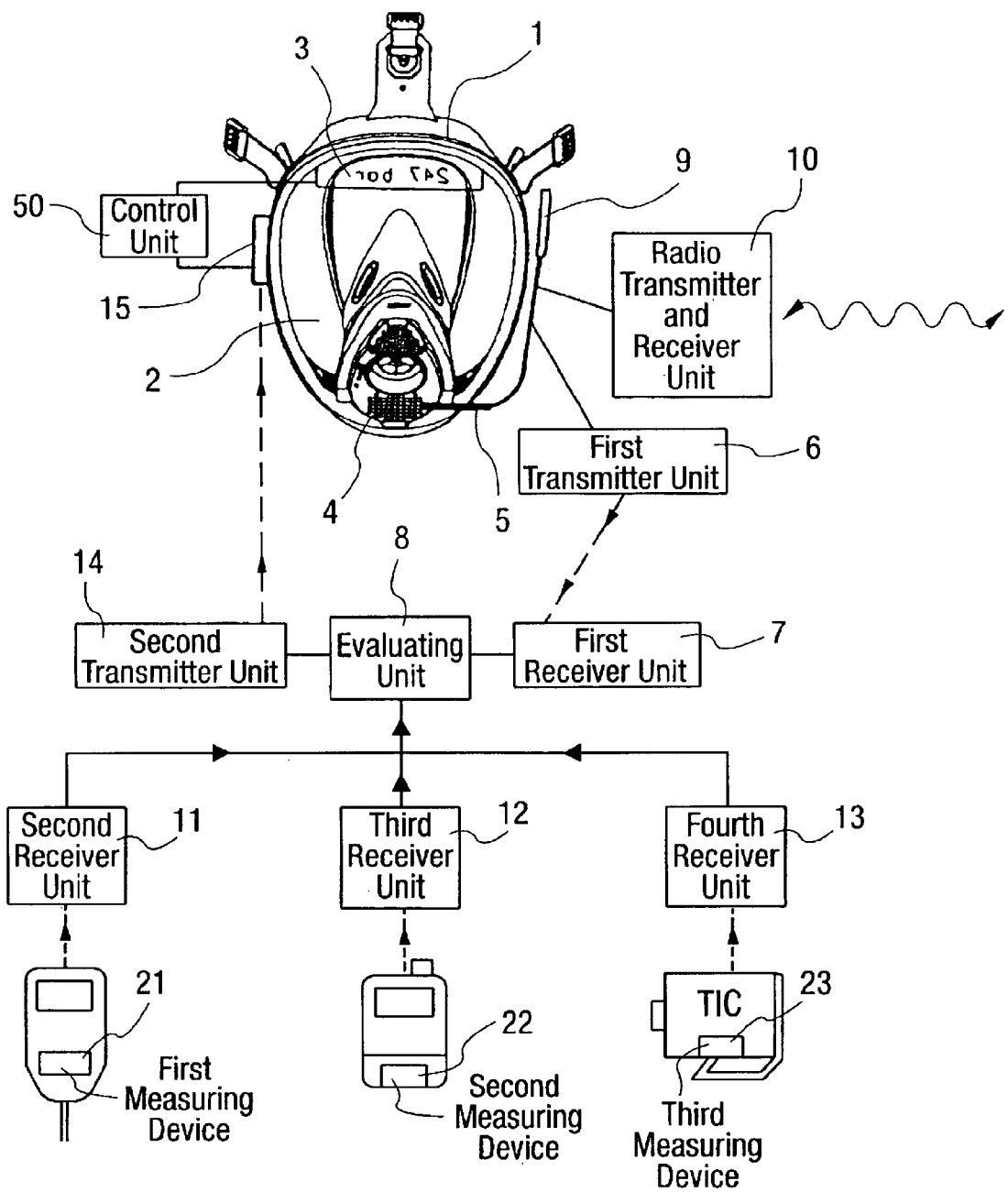

DATA COMMUNICATIONS SYSTEM FOR MASK OR HELMET USERS

FIELD OF THE INVENTION

The present invention pertains to a data communications system with a data display in a mask or helmet visor.

BACKGROUND OF THE INVENTION

A respirator with a display unit for transmitting measured data via a display field of the display unit into the field of view of a user of the apparatus is described in DE 44 25 262 C1. The display field comprises an LC (liquid crystal) display transparent at least to the transmission radiation. An optical concentrator is provided as the transmission radiation source.

U.S. Pat. No. 4,796,987 describes a transparent eye shield for swimmers with an LC (liquid crystal) data display arranged therein, so that the visibility of the data being displayed is ensured directly by the ambient light. None of these prior-art arrangements discloses a data communication with external peripheral devices.

The users of respirators, e.g., the personnel of firefighting or mine rescue teams, but also racing cyclists, motorcyclists or pilots, are usually equipped during the mission with respirators or head protectors, i.e., masks or helmets. The data necessary for carrying out the mission, e.g., the current pressure in the cylinder of the compressed air breathing apparatus, the remaining mission time, ambient temperature, measured data from relevant sensors, e.g., gas measuring devices, altimeters, velocity sensors, pressure gauges, or other information, such as retreat signals, instructions for actions to be taken, are usually made available to the user in separate display instruments. This also applies to camera displays of video cameras or infrared cameras, which are used during firefighting or rescue missions. The display instruments are often not in the direct field of view of the user and can be read only when the instruments have been additionally brought into the field of view. The communications exchange with the environment or the mission center takes place in the usual manner by means of communications systems which are known per se and are used in parallel by the mask or helmet user.

SUMMARY OF THE INVENTION

The primary object of the present invention is to provide a data communications system with a data display in a mask or helmet visor, which displays various data as needed.

According to the invention, a data communications system is provided with a data display in a mask or helmet visor. The mask or a helmet has a voice transmitter with a microphone as well as a transmitter unit on the output side. The mask or a helmet has a receiver unit for the data display on the input side. An evaluating unit is equipped with a receiver unit and a transmitter unit for data communication with the transmitter and receiver units of the mask or of the helmet. The evaluating unit receives the measured data from at least one measuring device via associated transmitter units. The evaluating unit has stored, preset voice patterns and is voice-controlled, so that depending on the voice signals received by means of the receiver unit and after comparison with the stored, preset voice patterns, it transmits selected measured data to the receiver unit, and these measured data are displayed in the data display.

One essential advantage of the present invention is the voice-controlled activation and visualization of data from various sources in various representations on the data display in the field of view of the mask or helmet user. The data display is preferably transparent, and the data are displayed by means of an LC (liquid crystal) display or OLED (organic light-emitting display). The data display may be designed as a transparent OLED.

The data communication between the transmitter and receiver units may take place in a wireless manner in the infrared frequency range or in an ISM (Industrial Scientific Medical) frequency range, especially at 2.4 or 5.8 GHz.

The microphone may additionally be connected to a radio transmitter and receiver unit for transmitting voice to a mission center.

The data display may have a second, inner pane at a spaced location from the visor, so that the data display is protected from mechanical effects and fogging is reduced.

The measuring device may be an infrared camera, a pressure gauge, a temperature sensor or a gas measuring device.

The mask or the helmet may have a control unit for setting the data display.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a schematic exemplary embodiment of a data communications system according to the present invention.

DESCRIPTION OF THE PREFERRED EMBODIMENT

Referring to the drawings in particular, a mask (user head gear) 1 with a visor 2 has a data display 3, which is arranged on the inner side of the visor 2 in the field of view of the mask user. A helmet with visor or helmet mask combination may be provided as the user head gear according to the invention. The display of the data display 3 in terms of size, quality, light intensity, etc., is controlled by means of a control unit 50 for the activation of LCD or OLED fields. OLEDs, "Organic Light-Emitting Displays," have become known recently because they are luminous in an advantageous manner and therefore do not require any additional background light in addition to the ambient light. They are based on a light-emitting polymer film, which can be activated by electric pulses. Power-saving and lightweight displays can thus be obtained by use of the OLED technique.

In the area of a voice transmitter 4, the mask 1 has a microphone 5, which sends the voice signals via a first transmitter unit 6 to a first receiver unit 7 of an evaluating unit 8. On the other hand, a loudspeaker 9 and a radio transmitter and receiver unit 10 can be switched on and used by the mask user for communication with a mission center. The evaluating unit 8 is used by the mask user in a voice-controlled manner. Voice recognition capabilities are provided in the evaluating unit 8 for comparison of incoming voice control input with stored preset voice patterns. As with other voice recognition systems, the evaluating unit 8 has stored preset voice patterns to provide a particular output. With the system of the invention, the output is display data, providing a voice-controlled display. Depending on the voice signals received from the evaluating unit 8 by means of the receiver unit 7 and from the first transmitter unit 6 and after comparison with stored, preset voice patterns, the evaluating unit 8 sends the measured signals of a first, second or third measuring device 21, 22, 23, which respectively are received from second, third and/or fourth receiver units 11, 12, 13, to a fifth receiver unit 15 at the mask 1 by means of a second transmitter unit 14. The measured signal or signals are then displayed in the data display 3. For example, the measuring device 21 is a pressure gauge with an associated ISM (Industrial, Science, Medical) transmitter. The measuring device 22 is a gas measuring device with a likewise associated ISM transmitter. The measuring device 23 is a thermo infrared camera (TI) with a likewise associated ISM transmitter. The "ISM" transmitter is an "Industrial Scientific Medical" transmitter, particularly for certain applications. Such applications, like the present applications, use the reserved transmission at various frequency bands in the megahertz and gigahertz range. The data transmission between the transmitter and receiver units 6, 7 and 14, 15 also takes place especially in a wireless manner and preferably likewise in the ISM frequency range. As an alternative, the data communication between two or more components of the data communications system may also take place via wires, glass fibers or in the infrared wavelength range, depending on the particular design and depending on the amount of data to be transmitted.

According to a preferred embodiment, the data display 3 in the visor 2 has a seal extending in the edge area, which is used to hold a second, inner pane, which can be mounted on the visor 2, at a spaced location from the first pane. The consequence of this is that the data display 3 is protected from mechanical effects and fogging is reduced by the air gap thus formed between the outer visor 2 and the inner pane. This effect is further enhanced when the inner pane, which is especially replaceable, is provided with an anti-fogging coating.

Data from various peripheral devices, especially measuring devices, which are controlled by the voice of a helmet or mask user, are displayed or optionally blanked by means of the present invention as needed by means of a data display 3 in the mask 1 or in a hood in the field of view of the mask or hood user. The size and the quality of the display is likewise set in a voice-controlled manner.

What is claimed is:

1. A mask or helmet data communications system, comprising:

a mask or helmet with a visor;

a visor data display connected to said visor;

a microphone connected to said mask or helmet;

a mask or helmet output transmitter unit connected to said microphone;

a mask or helmet receiver unit for receiving input display data, said mask or helmet receiver unit being connected to said visor data display;

a first measuring device with an associated transmitter unit;

a second measuring device with an associated transmitter unit;

an evaluating unit with an evaluating receiver unit and an evaluating transmitter unit for data communication with the mask or helmet output transmitter unit and the mask or helmet receiver unit, said evaluating unit receiving measured data from each of said first measuring device and said second measuring device via a respective said associated transmitter unit, said evaluating unit having stored, preset voice patterns corresponding respectively to received measured data from said first and second measuring devices, and being voice-controlled, so that depending on the voice signals received by said evaluating receiver unit and after comparison with stored preset voice patterns, said evaluating unit transmits only selected measured data corresponding to preset voice patterns that match received voice signals, to said mask or helmet receiver unit for display of said selected measured data by said visor data display.

2. A data communications system in accordance with claim claim 1, further comprising:

a voice transmitter connected to the mask or helmet, said microphone being operatively connected to said voice transmitter.

3. A data communications system in accordance with claim 1, wherein data communication between said transmitter and receiver units takes place in a wireless manner in one of an infrared frequency range, and an ISM (Industrial Scientific Medical) frequency range.

4. A data communications system in accordance with claim 1, further comprising:

a mission center with a mission center radio transmitter and mission center radio receiver unit and a mask or helmet radio transmitter and receiver unit for transmitting voice to a mission center wherein said microphone is additionally connected to said mask or helmet radio transmitter and receiver unit.

5. A data communications system in accordance with claim 1, wherein the data display comprises a transparent Organic Light-Emitting Display.

6. A data communications system in accordance with claim 1, wherein said mask or helmet has a second inner pane at a spaced location from the visor whereby said visor data display is protected from mechanical effects and fogging is reduced.

7. A data communications system in accordance with claim 1, wherein said first measuring device is one of an infrared camera, a pressure gauge, a temperature sensor or a gas measuring device and said second measuring device is one of an infrared camera, a pressure gauge, a temperature sensor or a gas measuring device.

8. A data communications system in accordance with claim 1, wherein the mask or helmet includes a control unit for setting the presentation of said data display.

9. A data communications system in accordance with claim 1, wherein said data communication between said transmitter and receiver units takes place in a wireless manner in the frequency range of from to 2.4 to 5.8 Ghz.

10. A mask or helmet data communications system, comprising:

a mask or helmet visor data display;

a voice transmitter connected to the mask or helmet;

a microphone operatively connected to said voice transmitter;

a microphone transmitter connected to said microphone;

a mask or helmet output transmitter unit connected to said microphone;

a mask or helmet receiver unit for receiving input display data, said mask or helmet receiver unit being connected to said visor data display;

a first measuring device with an associated transmitter unit;

a second measuring device with an associated transmitter unit;

an evaluating unit with an evaluating receiver unit, an evaluating transmitter unit for data communication with the mask or helmet output transmitter unit and the mask or helmet receiver unit, wherein said evaluating unit receives measured data from each of said first measuring device via said associated transmitter unit and said second measuring device via said associated transmitter unit, said evaluating unit having stored preset voice patterns including first measuring device display activation patterns for activating said mask or helmet visor data display, upon receiving voice signals substantially corresponding to the first measuring device display activation patterns, by transmitting selected measured data to said mask or helmet receiver unit for display of selected measured data by said mask or helmet visor data display for said first measuring device, first measuring device display deactivation patterns for deactivating said mask or helmet visor data display, upon receiving voice signals substantially corresponding to the first measuring device display deactivation patterns, by stopping transmission of the selected measured data to said mask or helmet receiver unit for ending a display of the selected measured data by said mask or helmet visor data display for said first measuring device, second measuring device display activation patterns for activating said mask or helmet visor data display, upon receiving voice signals substantially corresponding to the second measuring device display activation patterns, by transmitting selected measured data to said mask or helmet receiver unit for display of selected measured data by said mask or helmet visor data display for said second measuring device, second measuring device display deactivation patterns for deactivating said mask or helmet visor data display, upon receiving voice signals substantially corresponding to the second measuring device display deactivation patterns, by stopping transmission of the selected measured data to said mask or helmet receiver unit for ending a display of the selected measured data by said mask or helmet visor data display for said second measuring device.

11. A data communications system in accordance with claim 10, wherein at least one of said first measuring device and said second measuring device are disposed at a location physically separated from said mask or helmet.

12. A data communications system in accordance with claim 10, wherein data communication between said transmitter and receiver units takes place in a wireless manner in one of an infrared frequency range, and an ISM (Industrial Scientific Medical) frequency range.

13. A data communications system in accordance with claim 10, further comprising: a mission center with a mission center radio transmitter and mission center radio receiver unit and a mask or helmet radio transmitter and receiver unit for transmitting voice to a mission center wherein said microphone is additionally connected to said mask or helmet radio transmitter and receiver unit.

14. A data communications system in accordance with claim 10, wherein the data display is designed as a transparent Organic Light-Emitting Display.

15. A data communications system in accordance with claim 10, wherein said mask or helmet has a second inner pane at a spaced location from the visor whereby said visor data display is protected from mechanical effects and fogging is reduced.

16. A data communications system in accordance with claim 10, wherein said first measuring device is one of an infrared camera, a pressure gauge, a temperature sensor or a gas measuring device and said second measuring device is one of an infrared camera, a pressure gauge, a temperature sensor or a gas measuring device.

17. A data communications system in accordance with claim 10, wherein the mask or helmet includes a control unit for setting the data display.

18. A data communications system in accordance with claim 10, wherein said data communication between said transmitter and receiver units takes place in a wireless manner in the frequency range of from 2.4 to 5.8 GHz.

19. A mask or helmet data communications system, comprising:

a mask or helmet with a visor;

a visor data display connected to said visor;

a microphone connected to said mask or helmet;

a mask or helmet output transmitter unit connected to said microphone;

a mask or helmet output transmitter unit connected to said microphone;

a mask or helmet receiver unit for receiving input display data, said mask or helmet receiver unit being connected to said visor data display;

a first measuring device with an associated transmitter unit;

a second measuring device with an associated transmitter unit;

an evaluating unit with an evaluating receiver unit, an evaluating transmitter unit for data communication with the mask or helmet output transmitter unit and the mask or helmet receiver unit, wherein said evaluating unit receives measured data from each of said first measuring device via said associated transmitter unit and said second measuring device via said associated transmitter unit, said evaluating unit having stored preset voice patterns including first measuring device display activation patterns for activating said mask or helmet visor data display, upon receiving voice signals substantially corresponding to the first measuring device display activation patterns, by transmitting selected measured data to said mask or helmet receiver unit for display of selected measured data by said mask or helmet visor data display for said first measuring device, first measuring device display deactivation patterns for deactivating said mask or helmet visor data display, upon receiving voice signals substantially corresponding to the first measuring device display deactivation patterns, by stopping transmission of the selected measured data to said mask or helmet receiver unit for ending a display of the selected measured data by said mask or helmet visor data display for said first measuring device, second measuring device display activation patterns for activating said mask or helmet visor data display, upon receiving voice signals substantially corresponding to the second measuring device display activation patterns, by transmitting selected measured data to said mask or helmet receiver unit for display of selected measured data by said mask or helmet visor data display for said second measuring device, second measuring device display deactivation patterns for deactivating said mask or helmet visor data display, upon receiving voice signals substantially corresponding to the second measuring device display deactivation patterns, by stopping transmission of the selected measured data to said mask or helmet receiver unit for ending a display of the selected measured data by said mask or helmet visor data display for said second measuring device.

20. A data communications system in accordance with claim 19, further comprising:
a voice transmitter connected to the mask or helmet, said microphone being operatively connected to said voice transmitter.

* * * * *